Oct. 26, 1965   P. B. VANDERBURGH   3,213,611

VALVE

Filed April 23, 1962

To Nozzles

INVENTOR.
PAUL B. VANDERBURGH
BY Cecil F. Arens
ATTORNEY

United States Patent Office 3,213,611
Patented Oct. 26, 1965

3,213,611
VALVE
Paul B. Vanderburgh, South Bend, Ind., assignor to The Bendix Corporation, South Bend, Ind., a corporation of Delaware
Filed Apr. 23, 1962, Ser. No. 189,531
6 Claims. (Cl. 60—35.54)

This invention relates to a pneumatically operated valve providing a dumping schedule dependent upon the volume of the fluid to be dumped.

One of the thrust vector control systems for rocket engines is the introduction of a fluid into the throat of an exhaust nozzle to establish a shock wave which deflects the thrust relative to the missile for guidance purposes. In such a system the amount of injection fluid stored in the missile at launch must be sufficient to supply the maximum guidance activity expected. If, on a given flight this "maximum guidance" is not encountered, the unused injection fluid carried for this purpose will significantly reduce the missile's range, unless it is jettisoned. It is thus the principal object of this invention to maintain a scheduled quantity of injectant throughout a flight such that excess injectant is jettisoned.

Another object of this invention is to provide a valve connected to both fluid and gas supplies in a manner to control or schedule as a function of time the maximum amount of fluid remaining.

It is also an object of this invention to provide a valve that regulates fluid flow as a function of pressure.

Still another object is to use a regulator valve to control fluid weight as a function of time.

A further object is to provide a valve for regulating a fluid weight by use of an unregulated pressure in combination with a regulated pressure.

A still further object is to control the amount of thrust vectoring injectant as a function of time for a rocket engine.

A still further object is to provide a mechanism balancing a constant force against the sum of a decreasing force due to a pressurized gas and the increasing force due to gas bleed to a closed chamber, with any resulting unbalance being used to operate the valve.

Figure 1:
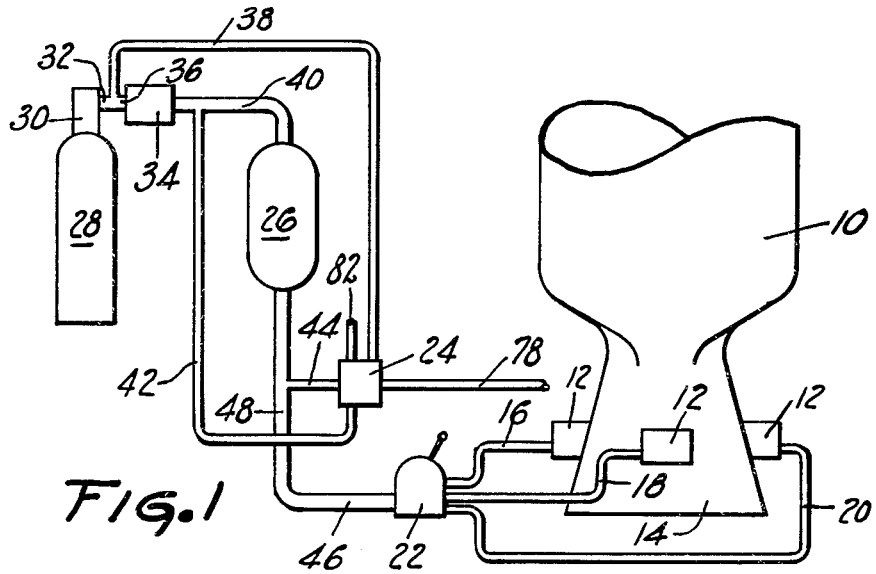
Figure 2:
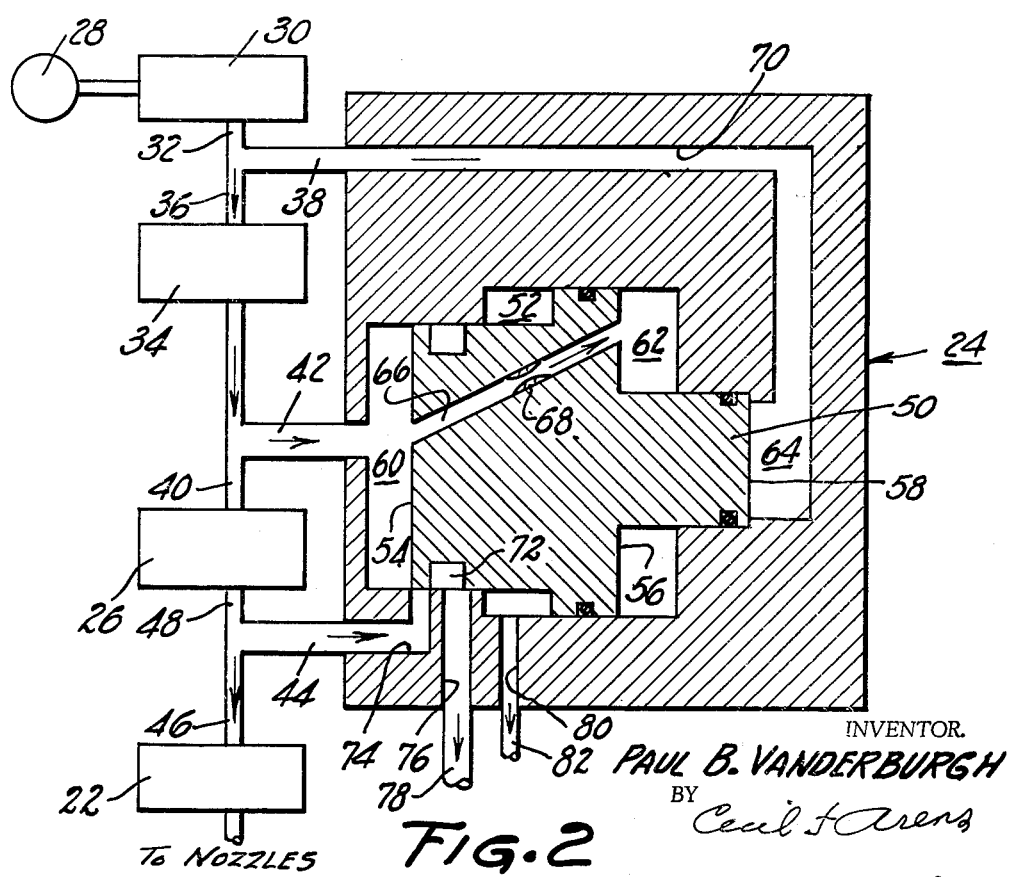

Other and further objects appear in the following description and drawing in which:

FIGURE 1 is a schematic presentation of the environment of the present invention; and FIGURE 2 is a sectional side view of a valve according to the present invention and its schematic connection into such a system as presented by FIGURE 1.

With reference to the environmental presentation of FIGURE 1, there is shown a rocket engine 10 of any known type having fluid injection means 12 mounted on a nozzle 14, three of which are shown. The injectors 12 are connected individually, as by the several conduits 16, 18 and 20, to a control means 22. An injectant, such as freon or other liqueous matter having equivalent low weight high density properties, is simultaneously supplied to the control means 22 and a valve device 24. The injectant is stored within a supply tank 26 that is pressurized by a high pressure gas from tank 28. In order to pressurize tank 26 an explosive valve 30 is provided with tank 28 to open tank 28 to a conduit 32 which has two branches 36 and 38 leading to a pressure regulator 34 and the valve 24, respectively. From the regulator 34 the fluid from tank 28 is directed by conduits 40 and 42 to the tank 26 and the valve 24, respectively; whereas the contents of tank 26 that are being expelled therefrom by the pressurized gas of tank 28 are directed by conduits 44 and 46, that join with conduit 48 from tank 26, to the valve device 24 and the control means 22, respectively.

The control means 22 may be energized remotely or otherwise and may take any general form known to those skilled in the art.

As for the valve 24, it is more particularly shown by FIGURE 2, and it includes a movable member 50 within a chamber 52. The member 50, which may take the form of a sliding valve having three faces 54, 56 and 58 of varied diameter, divides chamber 52 into three variable volume chambers 60, 62 and 64. The movable member 50 is also provided with a passage 66 within which is found a restriction 68, and this passage connects chambers 60 and 62. It may also be readily realized that the passage 66 may be within the housing rather than in the member 50 and still afford the proper scheduling of the increase of pressure within chamber 62. I have also determined that a schedule of increasing pressure for chamber 62 may be provided by a passage and a similar restriction therein from chamber 64 to chamber 62.

As may also be seen in FIGURE 2, the chamber 60 is connected, as by conduit 42, to a pressure regulated fluid; whereas chamber 64 is connected to an unregulated pressurized gas, as by conduit 38 and passageway 70 in the valve body. Just behind the face 54, the member 50 is grooved, as at 72, such that the groove may be positioned to connect a passageway 74 with another passageway 76, which passageway 76 leads to a conduit 78. Conduit 78 in the preferred form shown will direct the fluid from passageway 76 to the surrounding atmosphere, but this is not restrictive of the manner of dump provided by my invention for it is also realized that the fluid may be dumped within the exhaust gas flow to increase the density thereof and thereby provide increased thrust for the rocket. In addition, the valve body is vented to the atmosphere, as by passageway 80 and conduit 82, such that pressures within the casing do not hinder valve operations.

In operation, the valve 24 is energized simultaneously with the control system for the rocket engine 10 by the explosive valve 30 which ports a pressurized gas from tank 28 to regulator 34 and chamber 64. The gas from regulator 34 is ported to valve 24 and more particularly to chamber 60 thereof, and simultaneously the gas from regulator 34 is directed to tank 26 to start expelling the fluid from therewithin.

The immediate reaction in valve 24 is the rightward movement, as viewed in FIGURE 2, of the movable member 50 until the force on faces 56 and 58 are balanced by the force on face 54. In this position the movable member 50 has closed the passageway 74 and the contents of tank 26 are solely supplied to the control mechanism 22 which control mechanism selectively schedules the injectant from injectors 12, as by any known means such as mentioned above.

As may be observed, the fluid supplied to chamber 60 also passes through passageway 66 into another chamber 62. However, the restriction 68 in the passageway 66 decreases the flow to a predetermined rate. As the fluid in chamber 62 increases it may finally reach a pressure that, in conjunction with the pressure on face 58, will react against face 56 of movable member 50 to cause leftward movement of the member. This movement of the member immediately ports passageway 74 to the passageway 76 whereby the fluid of tank 26 may by-pass the control mechanism 22 and flow overboard or to an area within the exhaust gas flow such that it will not provide vectoring thereof and yet will increase the thrust thereof by increasing the density.

By proper sizing of the chambers 60, 62 and 64, the valve will operate to dump excess control fluid from tank 26 by sensing pressure decay of an expelling fluid and balancing this pressure against a scheduling function represented by a regulated pressure of the same expelling fluid. In other words, and with specific reference to the valve shown, as the pressure in chamber 62 is constantly rising due to a gradual buildup, the pressure in chamber 64 is gradually decreasing due to decay of the pressure in tank 28.

It may be readily appreciated that the movable member 50 may be eliminated such as by linking the member 50 with a valve so that movement of the member transmits motion in the linkage system to operate the valve thereto connected.

Although the invention has been illustrated as applied to a rocket to control the amount of injectant aboard at any one time, it is to be made clear that the scope of my invention can encompass, in addition to that mentioned, the control of the amount of propellant or fuel aboard at any one time. However, it is my intent that the proper scope of my invention rests solely in the appended claims.

I claim:

1. A valve for controlling a fluid supply, said valve comprising:
   a housing having an internal cavity;
   a fluid pressure responsive movable member provided with a plurality of faces of different effective areas within said housing dividing said cavity into a plurality of variable volume chambers to which said plurality of faces are exposed;
   a means to supply a high pressure fluid to one of said chambers and a lower pressure fluid to the other of said chambers to control movement of said movable member whereby a fluid may be regulated by said valve; and
   a means including a restricted passage connected to supply a portion of one of the high and lower pressure fluids to still another chamber which is located such that it cooperates with said high pressure chamber to oppose said low pressure chamber;
   said restricted passage providing a restricted flow of pressurized fluid into said chamber communicating therewith and a corresponding controlled rate of pressurization thereof.

2. A valve for controlling a fluid supply, said valve comprising:
   flow control means operatively connected to said fluid supply for controlling the flow thereof;
   a housing having an internal cavity;
   fluid pressure responsive means slidably carried in said cavity and together with said housing defining first, second, and third fluid chambers;
   said fluid pressure responsive means being operatively connected to said flow control means for actuating the same;
   a source of pressurized fluid at relatively high pressure;
   fluid pressure regulating means operatively connected to said source for controlling the flow of fluid therefrom to thereby reduce the relatively high fluid pressure to a lower pressure;
   a conduit communicating said pressurized fluid at said relatively high pressure to said first chamber;
   a conduit communicating pressurized fluid at said lower pressure to said third chamber; and
   a restricted passage communicating said third chamber with said second chamber;
   said relatively high and lower fluid pressures acting in opposition against said fluid pressure responsive means to actuate the same and thus the flow control means connected thereto to a first flow control position;
   said second chamber being pressurized at a controlled rate by the flow of fluid through said restricted passage to thereby effect further pressurization of said fluid pressure responsive means in opposition to said lower fluid pressure and subsequent actuation of said flow control means to a second flow control position.

3. A valve for controlling a fluid supply, said valve comprising:
   flow control means operatively connected to said fluid supply for controlling the flow thereof;
   a housing having an internal cavity;
   fluid pressure responsive means slidably carried in said cavity and together with said housing defining first, second and third fluid chambers;
   said fluid pressure responsive means being operatively connected to said flow control means for actuating the same;
   a source of pressurized fluid at relatively high pressure;
   fluid pressure regulating means operatively connected to said source for controlling the flow of fluid therefrom to thereby reduce said relatively high fluid pressure to a lower pressure;
   a conduit communicating said pressurized fluid at relatively high pressure with said first chamber;
   a conduit communicating said pressurized fluid at said lower pressure with said third chamber; and
   a restricted passage communicating said second chamber with one of said first and third chambers;
   said relatively high and lower fluid pressures acting in opposition against said fluid pressure responsive means to actuate the same and thus the flow control means connected thereto to a first flow control position;
   said restricted passage providing a restricted flow of pressurized fluid and a corresponding control rate of pressurization of said fluid pressure responsive means in opposition to said lower fluid pressure to thereby actuate said flow control means to a second flow control position.

4. In fluid flow regulating means for automatically regulating the amount of a first pressurized fluid in a tank in response to a plurality of fluid pressures derived from an expendable second pressurized fluid supplied to the tank to pressurize the first fluid:
   a housing having a cavity formed therein;
   a conduit for supplying a second pressurized fluid to the tank to pressurize the first fluid;
   pressure regulating means operatively connected to said conduit for regulating the pressure of the second pressurized fluid supplied to the tank;
   valve means operatively connected to the tank for controlling the flow of first pressurized fluid therefrom;
   pressure responsive means slidably carried in said cavity and together with said housing defining first, second and third fluid chambers and operatively connected to said valve means for actuating the same;
   said pressure responsive means being provided with first, second and third effective areas exposed to said first, second and third chambers, respectively, and
   first passage means communicating the second pressurized fluid at unregulated pressure with said first chamber;
   second passage means communicating the second pressurized fluid at regulated pressure with said second chamber;
   a restricted passage communicating said second chamber with said third chamber;
   said pressure responsive means being responsive to the unregulated and regulated pressures of the second pressurized fluid which act in opposition thereagainst to actuate said pressure responsive means thereby urging said valve means to a first flow control position;
   said second chamber being pressurized at a controlled rate by the flow through said restricted passage to said third chamber whereupon said pressure responsive means is further pressurized in opposition to said regulated pressure and actuated accordingly to urge said valve means to a second flow control position.

5. Fliud flow regulating means as claimed in claim 4 wherein said second and third effective areas are larger than said first effective area.

6. In combination with a rocket engine having a plurality of fluid injection means associated with a rocket nozzle of the rocket engine, a means controlling the available amount of an expendable injectant according to a preselected schedule including:
  an injectant supply means in communication with said fluid injection means;
  a means for expelling said injectant from said supply means including an expendable source of pressurized fluid for pressurizing said injectant supply means;
  pressure regulating means for regulating the pressure of said pressurized fluid supplied to said injectant supply means;
  valve means operatively connected to said injectant supply means for expelling said injectant to the atmosphere in the event that said injectant is not expelled by said fluid injectant means at a predetermined rate;
  said valve means including a housing having a cavity therein and a fluid pressure responsive member slidably carried in said cavity;
  said fluid pressure responsive member together with said housing defining a plurality of fluid chambers;
  a conduit communicating said pressurized fluid at unregulated pressure with one of said plurality of fluid chambers;
  a conduit communicating said pressurized fluid at regulated pressure with another of said plurality of fluid chambers; and
  a restricted passage communicating one of said regulated and unregulated fluid pressures with a third of said plurality of chambers;
  said third chamber being pressurized at a predetermined rate by the flow of pressurized fluid through said restricted passage;
  said unregulated fluid pressure decreasing as a function of the rate at which said injectant supply means is expended by the fluid injection means;
  said unregulated fluid pressure and said fluid pressure in said third chamber acting against said pressure responsive member in opposition to said regulated pressure such that said valve means is actuated to an open position to expel said injectant to the atmosphere in the event that said rate of increase in pressure in said third chamber exceeds the rate at which said unregulated pressure decreases.

References Cited by the Examiner
UNITED STATES PATENTS
2,426,900  9/47  Parker _____ 251—43

FOREIGN PATENTS
1,197,701  6/59  France.

SAMUEL LEVINE, *Primary Examiner.*
JULIUS E. WEST, *Examiner.*